United States Patent
Astley et al.

(10) Patent No.: US 6,728,715 B1
(45) Date of Patent: Apr. 27, 2004

(54) METHOD AND SYSTEM FOR MATCHING CONSUMERS TO EVENTS EMPLOYING CONTENT-BASED MULTICAST ROUTING USING APPROXIMATE GROUPS

(75) Inventors: Mark Astley, Lincoln Park, NJ (US); Robert E. Strom, Ridgefield, CT (US); Daniel C. Sturman, Englewood Cliff, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/538,471

(22) Filed: Mar. 30, 2000

(51) Int. Cl.[7] .............................................. G06F 17/30
(52) U.S. Cl. ........................... 707/10; 707/100; 725/34; 725/35
(58) Field of Search ...................... 707/10, 100; 395/33, 395/275, 375; 725/34, 35

(56) References Cited

U.S. PATENT DOCUMENTS

| | | | | |
|---|---|---|---|---|
| 5,237,662 A | * | 8/1993 | Green et al. ................. | 395/275 |
| 5,257,369 A | | 10/1993 | Skeen et al. ................. | 395/650 |
| 5,321,813 A | | 6/1994 | McMillen et al. .......... | 395/200 |
| 5,398,012 A | | 3/1995 | Derby et al. ........... | 340/825.03 |
| 5,465,335 A | * | 11/1995 | Anderson ................... | 395/375 |
| 5,517,562 A | | 5/1996 | McConnell ................. | 379/207 |
| 5,522,046 A | | 5/1996 | McMillen et al. ..... | 395/200.15 |
| 5,535,322 A | | 7/1996 | Hecht ......................... | 395/155 |
| 5,557,798 A | | 9/1996 | Skeen et al. ................. | 395/650 |
| 5,566,337 A | * | 10/1996 | Szymanski et al. ........... | 395/33 |
| 5,581,764 A | | 12/1996 | Fitzgerald et al. .......... | 395/703 |
| 5,612,957 A | | 3/1997 | Gregerson et al. .......... | 370/401 |
| 5,790,177 A | * | 8/1998 | Kassatly ....................... | 725/87 |
| 5,870,605 A | | 2/1999 | Bracho et al. .............. | 395/682 |
| 5,873,084 A | | 2/1999 | Bracho et al. ................. | 707/10 |
| 5,881,315 A | | 3/1999 | Cohen ......................... | 395/872 |
| 5,893,911 A | * | 4/1999 | Piskiel et al. ................. | 707/10 |
| 6,091,724 A | * | 7/2000 | Chandra et al. ............. | 370/390 |
| 6,119,163 A | * | 9/2000 | Monteiro et al. ........... | 709/227 |
| 6,463,585 B1 | * | 10/2002 | Hendricks et al. ............. | 725/35 |

OTHER PUBLICATIONS

D. Scott Alexander et al., "The Switch Ware Active Network Architecture," IEEE Network Special Issue on Active and Cotnrollable Networks, May/Jun. 1998, vol. 12, No. 3, pp. 29–36.

Uyless Black, TCP/IP & Related Protocols, Second Edition, McGraw–Hill, 1995, pp. 122–126.

Antonio Carzaniga, "Architecture for an Event Notification Service Scalable to Wide–area Networks". Available from http://www.cs.colorado.edu/users/carzaniga/siena/index.html.

Stephen E. Deering, "Multicast Routing in InternNetworks and Extended LANs," ACM Computer Communications Review, 18(4), 1988, pp. 55–64.

(List continued on next page.)

*Primary Examiner*—Wayne Amsbury
*Assistant Examiner*—Cam-Linh T. Nguyen
(74) *Attorney, Agent, or Firm*—Douglas W. Cameron, Esq.; Kevin P. Radigan, Esq.; Heslin Rothenberg Farley & Mesiti P.C.

(57) ABSTRACT

A facility is provided for distributing events to consumers in a content-based publish-subscribe system, wherein the consumers each have at least one subscription. The facility includes deriving a set of g approximate multicast groups from a larger set of G possible multicast groups in the publish-subscribe system. The deriving includes exploiting knowledge of subscription predicates of the consumers of the publish-subscribe system. The set of G possible multicast groups is collapsed to the smaller set of g approximate multicast groups, while minimizing the expected performance penalty in using the approximate multicast groups. The set of g approximate multicast groups is then used to forward events to consumers within the publish-subscribe system.

57 Claims, 12 Drawing Sheets

OTHER PUBLICATIONS

Birman, Kenneth P., "The Process Group Approach To Reliable Distributed Computing", Communications of the ACM, vol. 36, No. 12, pp. 37–53 (Dec. 1993).

Oki et al., "The Information Bus—An Architecture for Extensible Distributed Systems", SIGOPS '93, ACM 0–89791–632–8/93/0012, pp. 58–68 (1993).

Cahoon et al., "Performance Evaluation Of A Distributed Architecture For Information Retrieval", SIGIR Forum (USA), Zurich, Switzerland, pp. 110–118 (Aug. 1996).

Powell, David, "Group Communication", Communcations Of The ACM, vol. 39, No. 4, pp. 52–100 (Apr. 1996).

Lorenzo Aguilar, "Datagram Routing for Internet Multicasting," ACM Computer Communications Review, 14(2), 1984, pp. 58–63.

John Gough and Glenn Smith, "Efficient Recognition of Events in a Distributed Systems," Proceedings of ACSC–18, Adelaide, Australia, 1995.

Bill Segall and David Arnold, "Elvin has left the building: A publish/subscribe notification service with quenching," Proceedings of AUUG97, Brisbane, Australia, Sep. 1997. Available from http://www.dstc.edu.au/Elvin/papers/AUUG97//AUUG97.html.

R. Sharma, S. Keshav, M. Wu and L. Wu, "Environments for Active Networks," Proceedings of the IEEE 7th International Workshop on Network and Operating System Support for Digital Audio and Visual, 1997, pp. 77–84.

Tony Speakman, Dino Farinacci, Steven Lin and Alex Tweedly," PGM Reliable Transport Protocol," IETF Internet Draft, Aug. 24, 1998.

D. Tennenhouse, J. Smith, W.D. Sincoskie, D. Wetherall, G. Minden, "A Survey of Active Network Research," IEEE Communications Magazine, Jan., 1997, vol. 35, No. 1, pp. 80–86.

Cormen, Thomas H., Leiserson, Charles E. and Rivest, Ronald L., Introducution to Algorithms, Ch. 24, "Minimum Spanning Trees," pp. 498–513, McGraw–Hill Book Company (1990).

Internet World Wide Web Site Section entitled "TIB/Rendezvous White Paper," located at Web Site http://www.rv.tibco.com/rvwhitepaper.html, printed pp. 1–16, (1994–1997).

Inernet World Wide Web Site Section entitled "Intranet/Internet," located at Web Site http://www.tibco.com/products/internet.html, printed p. 1 of 1, date printed from Internet Apr. 29, 1997, actual date of paper unknown.

Internet World Wide Web Site Section enttiled "TIBnet Overview," located at Web Site http://www.tibco.com/announce/tibwhite/html, printed pp. 1–5, date printed from Internet Apr. 29, 1997, actual date of paper unknown.

Internet World Wide Web Site Section entitled "NEONet Product Overview," located at Web Site http://www.neonsoft.com/prods/neonover.html, printed pp. 1–18, date printed from Internet Oct. 20, 1997, actual date of paper unknown.

Skeen, Dale Ph.D. and Vitria Technology, Inc. "Velociti The Enterprise–Capable Publish–Subscribe Server," located at Internet World Wide Web Site http://www.vitria.com/whitepapers/velocitiwp.html, printed pp. 1–17, date printed from Internet Jan. 14, 1998, actual date of paper unknown.

Allison, C., Harrington, P., Huang, F. and Livesey, M., "Scalable Services for Resource Management in Distributed and Networked Environments", IEEE Comput, Soc. Press, ix+173, pp. 98–105(1996).

Weiss, R., Velez, B., Sheldon, M.A., Namprempre, C., Szilagyi, P., Duda, A. and Gifford, D.K., HyPursuit: A Hierarchical Network Search Engine That Exploits Content–Link Hypertext Clustering: {IN Seventh ACM Conference on Hypertext; Hypertext '96, Proceedings of Hypertext '96, Washington, D.C., USA, Mar. 16–20, 1996, ACM, xiii+264, pp. 180–193}(Abstract Only).

Hanson, et al., "A Predicate Matching Algorithm for Database Rule Systems", Published at Proceedings of SIGMOD, pp. 271–280 (1991).

Mishra et al., "Consul: A Communication Substrate for Fault–Tolerant Distributed Programs", TR91–32, Department of Computer Science, The University of Arizona, pp. 1–33 (Nov. 1991).

* cited by examiner

501

|   | 0 | 1 | 2 | 3 | 4 | 5 | >5 |
|---|---|---|---|---|---|---|----|
| x | .4 | .2 | .1 | .08 | .08 | .07 | .07 |
| y | .1 | .1 | .1 | .1 | .1 | .1 | .4 |
| z | 0 | .1 | .2 | .3 | .35 | .05 | 0 | ns
METHOD AND SYSTEM FOR MATCHING CONSUMERS TO EVENTS EMPLOYING CONTENT-BASED MULTICAST ROUTING USING APPROXIMATE GROUPS

CROSS-REFERENCE TO RELATED APPLICATIONS

This application contains subject matter which is related to the subject matter of the following applications, each of which is assigned to the same assignee as this application. Each of the below listed applications is hereby incorporated herein by reference in its entirety:

"Method And System For Matching Consumers To Events," Astley et al., Ser. No. 08/975,280, Filed Nov. 20, 1997, and issued Apr. 10, 2001, U.S. Pat. No. 6,216,132;

"Routing Messages Within A Network Using The Data Content Of The Message," Chandra et al., Ser. No. 08/975,303, filed Nov. 20, 1997, and issued Jul. 18, 2000, U.S. Pat. No. 6,091,724;

"Method And System For Applying Cluster-Based Group Multicast to Content-Based Publish-Subscribe Systems," Gurdudth S. Banavar, Ser. No. 09/538,482, co-filed herewith, and issued Jan. 1, 2002, as U.S. Pat. No. 6,336,119.

TECHNICAL FIELD

This invention relates, in general, to event computing systems and, more particularly, to a content-based multicast routing technique which delivers events to consumers of an event computing system interested in a particular set of events.

BACKGROUND ART

A common practice for integrating autonomous components within a computing system has been to utilize events. Events are, for example, data generated by a provider and delivered through a communication medium, such as a computer network, hard disk, or random access memory, to a set of interested consumers. The providers and consumers need not know one another's identity, since delivery is provided through intermediary software. This independence between provider and consumer is known as decoupling.

One example of an event computing system is a database event system. Modern database systems include support for event triggers. Event triggers associate a filter, which is a predicate that selects a subset of events and excludes the rest, with an action to take in response to events on the database. An event on a database is any change to the state of the database.

In database event systems, gating tests have been used to determine which consumers of a system are interested in a particular event. That is, gating tests have been used to match filters in event triggers to events. As described in "A Predicate Matching Algorithm for Database Rule Systems," by Hanson et al., Proceedings of SIGMOD (1991), pp. 271–280, gating tests identify a single predicate for each filter as primary, and tests are organized in a data structure based on this primary predicate. Additionally, the data needs to be organized based on the primary predicate.

Another example of an event computing system is a distributed event system, also known as a publish/subscribe system. A publish/subscribe system is a mechanism where subscribers express interest in future information by some selection criterion, publishers provide information, and the mechanism delivers the information to all interested subscribers. Current publish/subscribe systems organize information around groups (also called channels, subjects or streams). Providers or publishers publish events to groups and consumers or subscribers subscribe to all data from a particular group.

One example of a publish/subscribe system is described in detail in U.S. Pat. No. 5,557,798, issued to Skeen et al. on Sep. 17, 1996, and entitled "Apparatus And Method For Providing Decoupling Of Data Exchange Details For Providing High Performance Communication Between Software Processes", which is hereby incorporated herein by reference in its entirety. In U.S. Pat. No. 5,557,798, the publisher of an event annotes each message with a group identifier called a subject and a subscriber subscribes to a particular subject. Thus, if a subscriber is interested in just a portion of the events having a given subject, it would have to receive the entire subject and then discard the unwanted information.

Based on the foregoing, a need exists for a matching capability that does not require the partitioning of data into subjects. A further need exists for a matching capability that enables a consumer to use any filtering criterion expressible with the available predicates. Additionally, a need exists for a mechanism that allows a consumer to receive only the information that it desires, such that the filtering is done independent of the consumer.

SUMMARY OF THE INVENTION

One approach to addressing the above-noted needs is described in the above-incorporated, co-pending U.S. patent application Ser. No. 08/975,280, entitled "Method and System for Matching Consumers to Events." In this approach, referred to herein as a content-based event computing system, the matching facility includes a search data structure (e.g., a search tree or search graph), which is used to determine the consumers interest in a particular event. Content-based subscription is the ability of subscribers to specify interest in events based on operations limited only by the structure of the events and the operation supported by the pattern language.

Applicants have identified a problem arising with content-based subscription which arises when using internet protocol (IP) multicasting of an event. In a practical content-based subscription system, there will typically be too many groups of clients or consumers to use a multicast facility.

As one example, the environment of this invention may include content-based, publish/subscribe systems deployed over IP networks such as the Internet. Clients are either publishers or subscribers, and are attached to machines referred to herein as brokers. The publisher's broker receives a published message (also referred to herein as an "event") and delivers it to subscriber brokers at least one of whose attached clients has a subscription matched by the message. These subscriber brokers then forward the message to the at least one attached client. Content-based systems are more flexible and provide more selectivity than subject-based systems. However, the multicast problem for content-based message delivery middleware is more complex than for subject-based delivery once the number of destinations for messages becomes large. It may no longer be straightforward or efficient to use IP multicast groups to distribute messages of a content-based system over a network because the number of such groups required grows rapidly with the number of subscriptions. This number eventually becomes so large that either the supported range of multicast addresses is exceeded or the overhead of setting up and listening to such a large number of multicast addresses becomes excessive.

The goal of the present invention is to replace a potentially large set of IP multicast addresses with a much smaller set, which will be a conservative approximation. That is, every broker which might require a message will receive it, but certain brokers may possibly receive messages they do not actually need. These extra messages cause wasted bandwidth in the network and wasted processing time in the receiving broker, which can be quantified by a penalty function. Thus, the present invention collapses a large number of groups to a smaller number of groups, while approximately minimizing the expected penalty. The invention disclosed herein uses dynamic information about the existing set of subscriptions and the expected probabilities of different events in order to perform this collapse.

To summarize, the shortcomings of the prior art are overcome and additional advantages are provided through the provision of a method for distributing events to consumers in a content-based publish/subscribe system. The method includes: deriving a set of g approximate multicast groups from a larger set of G possible multicast groups in the publish-subscribe system, the deriving including exploiting knowledge of subscription predicates of at least some consumers of the publish-subscribe system; and using the set of g approximate multicast groups to forward an event to at least one consumer withing the publish-subscribe system.

In another aspect, the present invention provides at least one program storage device readable by a machine, tangibly embodying at least one program of instructions executable by the machine to perform a method for distributing events to consumers in a content-based publish-subscribe system, wherein the consumers each have at least one subscription. The method includes: deriving a set of g approximate multicast groups from a larger set of G possible multicast groups in the publish-subscribe system. The deriving including exploiting knowledge of subscription predicates of at least some consumers of the publish-subscribe system; and using the set of g approximate multicast groups to forward an event to at least one consumer within the publish-subscribe system.

In a further aspect, an article of manufacture is provided herein which includes at least one computer usable medium having computer readable program code means embodied therein for causing the distributing of events to consumers in a content-based publish-subscribe system, wherein the consumers each have at least one subscription. The computer readable program code means in the article of manufacture includes: computer readable program code means for causing a computer to effect deriving a set of g approximate multicast groups from a larger set of G possible multicast groups in the publish-subscribe system. The deriving including exploiting knowledge of subscription predicates of at least some consumers of the publish-subscribe system; and computer readable program code means for causing a computer to effect using the set of g approximate multicast groups to forward an event to at least one consumer within the publish-subscribe system.

In a further aspect, a system is provided for distributing events to consumers in a content-based publish-subscribe system. The system includes means for deriving a set of g approximate multicast groups from a larger set of G possible multicast groups in the publish-subscribe system. The means for deriving includes means for exploiting knowledge of subscription predicates of at least some consumers of the publish-subscribe system. The system further includes means for using the set of g approximate multicast groups to forward an event to at least one consumer within the publish-subscribe system.

To restate, there are numerous advantages of a distribution approach such as presented herein in comparison with other techniques for distributing events in a content-based publish-subscribe system. In the following discussion, the term "exact multicast group" refers to a subset of brokers that share a common subscription predicate but does not overlap with any other subscription predicate (also referred to herein as "initial groups"). The term "IP multicast group" refers to an assignment of a multicast system address to a collection of brokers, irrespective of predicates.

Naive use of multicast techniques: Using multicast requires two preparatory steps before messages may be sent: step one is to actually construct all the groups required for a particular application, step two is to instruct each broker to listen to one or more groups. Naive multicast refers to the technique of creating one IP multicast group for every exact multicast group. Relative to naive multicast, the approach presented herein has the following advantages:

1. Address Space Limits: In the present approach, a multicast solution is provided even though the number of exact multicast groups exceeds the number of IP multicast groups allowed by the system.

2. Group Creation Cost: The number of actual multicast groups used may be adjusted in order to minimize the initial cost of group setup (step one above). In contrast, group creation under the naive approach may be extremely expensive due to the large number of groups.

3. Broker Overhead: the number of actual multicast groups used may be adjusted in order to minimize the overhead experienced by each broker (relating to step two above). In contrast, broker overhead under the naive approach may be unusually high due to the large number of groups each broker must listen to.

Broadcast or "flooding" techniques: Flooding is a variant of multicast where one group is created and every broker listens to the same group. Thus, each message sent to this group is received by every broker (hence "flooding"), regardless of whether or not a broker has a client wishing to receive the event. Relative to flooding, the approach presented herein has the following advantages:

1. Waste Messages: Depending on the distribution of client subscriptions, the flooding approach tends to generate large numbers of wasted messages: messages which are sent to brokers that have no client wishing to receive the message. Waste messages cause brokers to waste CPU time on handling the unwanted message. Although waste messages are possible using the present approach, on average far fewer waste messages are generated and thus the present invention imposes lower overhead on broker CPU time.

2. Bandwidth Utilization: Waste messages also waste network bandwidth because messages may be unnecessarily sent down certain network links. Thus, waste messages clog up network links and routers with unnecessary traffic. In the present approach, fewer waste messages are generated and thus network bandwidth is utilized more efficiently.

Point-to-point techniques: A publishing broker using the point-to-point approach distributes events either by directly sending the event to each destination broker one at a time, or by sending the event through a "tree" of brokers, where each broker in the tree may forward the event to one or more of its neighbors (also by sending the event to its neighbors one at a time). For example, reference the above-incorporated United States patent application entitled "Routing Messages Within A Network Using the Data Content of the Message." Relative to point-to-point, the present approach has the following advantages:

1. CPU Utilization: A broker using the present invention only needs to make one "transmit" call to distribute an event; the multicast system performs all the routing necessary to ensure the correct delivery of the event. On the other hand, a broker using point-to-point distribution must make a separate "transmit" call for each neighboring broker the event should be delivered to. The latter approach imposes higher overhead on the broker because it must spend time making additional "transmit" calls (when it could be spending that time servicing other messages and hence increasing system throughput).

2. Bandwidth Utilization: Brokers using the point-to-point approach may send a single event multiple times over the same network link in cases where neighboring brokers share a common subset of network links. This approach wastes network bandwidth because from a network perspective, the additional sends down common links are unnecessary traffic. In contrast, multicast ensures that each network link is used at most once. Therefore, in general, the present approach wastes less bandwidth than point-to-point approaches. Moreover the amount of bandwidth wasted is a tunable property under our invention.

3. Latency: Multicast approaches exploit fast internet routers to efficiently deliver events. The point-to-point approach using a tree requires intermediate brokers to process messages and forward them to other brokers. The extra step of receiving a message, processing it, and passing it on to other brokers introduces delays and end-to-end message latency. Because the present approach utilizes multicast, a much lower overall latency is experienced than these multi-hop point-to-point approaches.

Additional features and advantages are realized through the techniques of the present invention. Other embodiments and aspects of the invention are described in detail herein and are considered a part of the claimed invention.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIG. 8 illustrates one embodiment of a third step in the construction of the initial groups lattice in accordance with the present invention. A node A is "downward linked" to a node B if the predicate in A is a superset of the predicate in B. For example, node 800b is downward linked to node 800a because any event which matches the predicate x=1 & y=2 & z=5 will also match the predicate z=5. Similarly, node 800c is downward linked to node 800b. Transitive downward links are removed. For example, if node A is downward linked to node B, and node B is downward linked to node C, then any downward link from node A to node C is removed. Thus, node 800c is not downward linked to node 800a.

FIG. 8 is transformed to FIG. 9 by propagating broker sets along downward links. Nodes with equal broker sets are then combined, and finally, the exclusive probabilities of each remaining node are computed as depicted in FIG. 11.

BEST MODE FOR CARRYING OUT THE INVENTION

In accordance with the principles of the present invention, a routing capability is provided, which facilitates the forwarding of events to consumers. More particularly, in the context of a content-based publish-subscribe system deployed over a wide area network, such as the Internet, the routing facility presented herein uses subscription sets and event distribution sets to construct a conservative set of approximate Internet protocol (IP) multicast groups to meet specified tolerances for a maximum number of groups or a maximum percentage of wasted messages. Advantages are realized in using the approximate groups approach described herein over other known approaches, and optimizations are described herein for enhancing efficiency of the construction of these approximate groups.

In an arbitrary collection of content-based subscriptions, even with a small number N of subscribers, there are 2 to the power N possible multicast groups. Even for a small N, installing this number of groups soon becomes impractical. On the other extreme, broadcasting messages to all subscribers when most subscribers may wish to receive only a small fraction of the messages wastes bandwidth. Therefore, a solution involving a smaller number of "approximate groups" is desired. The construction of an optimal set of approximate groups to minimize the likelihood of wasted messages for a set of groups of a given size is a computationally intractable problem, and therefore, a more computationally efficient solution approximating this optimal set is desired. The present invention is directed to meeting this need.

More particularly, the present invention comprises an algorithm that ascertains as input (1) a set of subscriptions expressed as conjunctions of equality tests on event attributes, and a destination IP address per subscription; (2) a frequency distribution of the possible values of each event attribute; (3) a tolerance restriction specifying either (a) a maximum number of approximate groups to be generated or (b) a maximum tolerated expected value of the number of wasted messages delivered per message published. The approach described herein produces as output a set of multicast groups each having one or more destination IP address(es); and (4) a cost function specifying the penalty associated with merging a given pair of groups.

By way of example, approximate group construction and use is described below with reference to FIGS. 1–14 of this application. Note, however, that the multicast routing facility described herein may be used in various computing systems. Certain systems are described in greater detail in the above-incorporated, co-pending patent application entitled "Method And System For Matching Consumers To Events."

Figure 1:
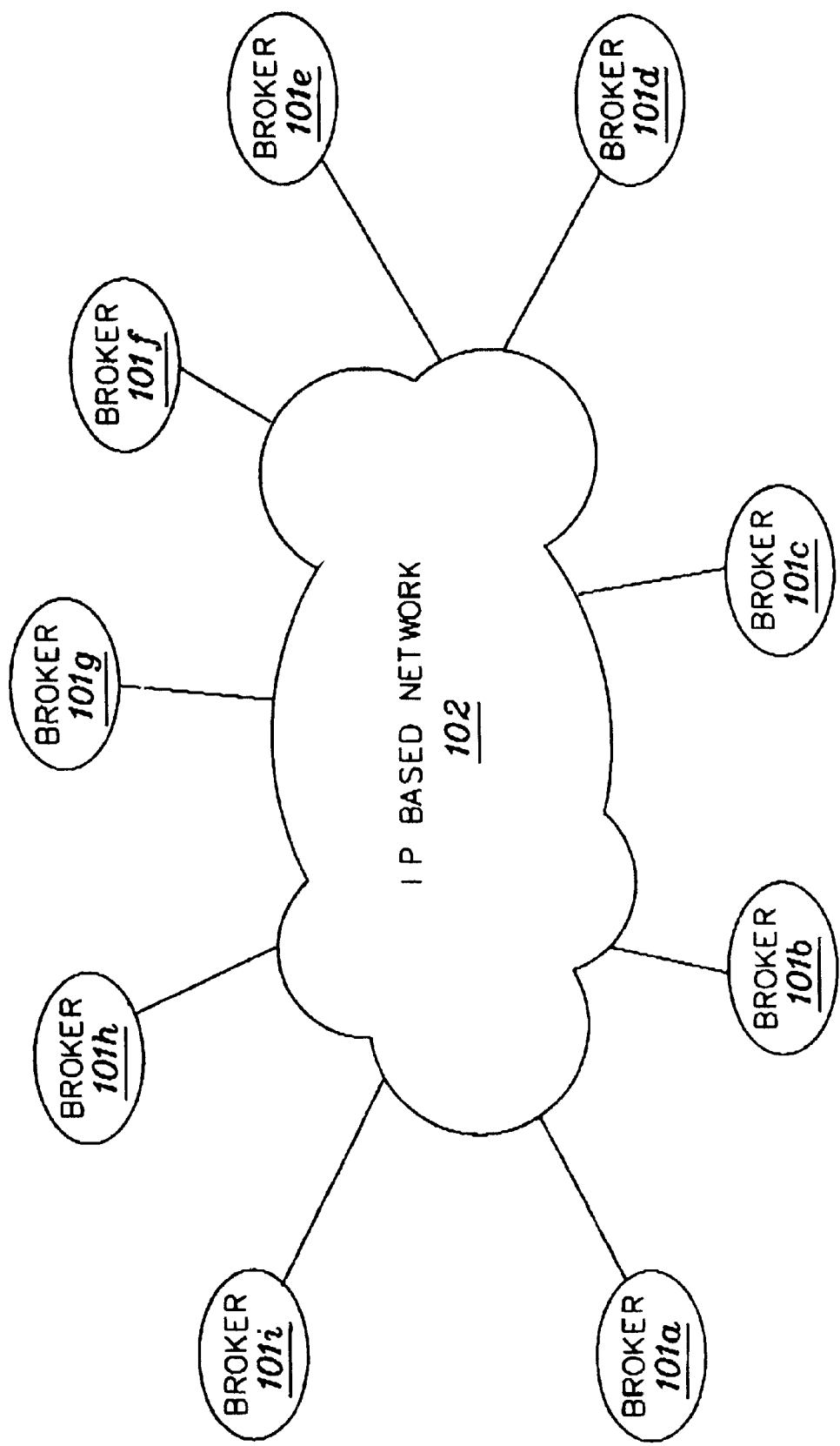
FIG. 1 depicts a sample environment for deployment of one embodiment of the invention. The environment includes a collection of brokers 101a–101i, connected through an IP-based network, such as the Internet.
Figure 2:
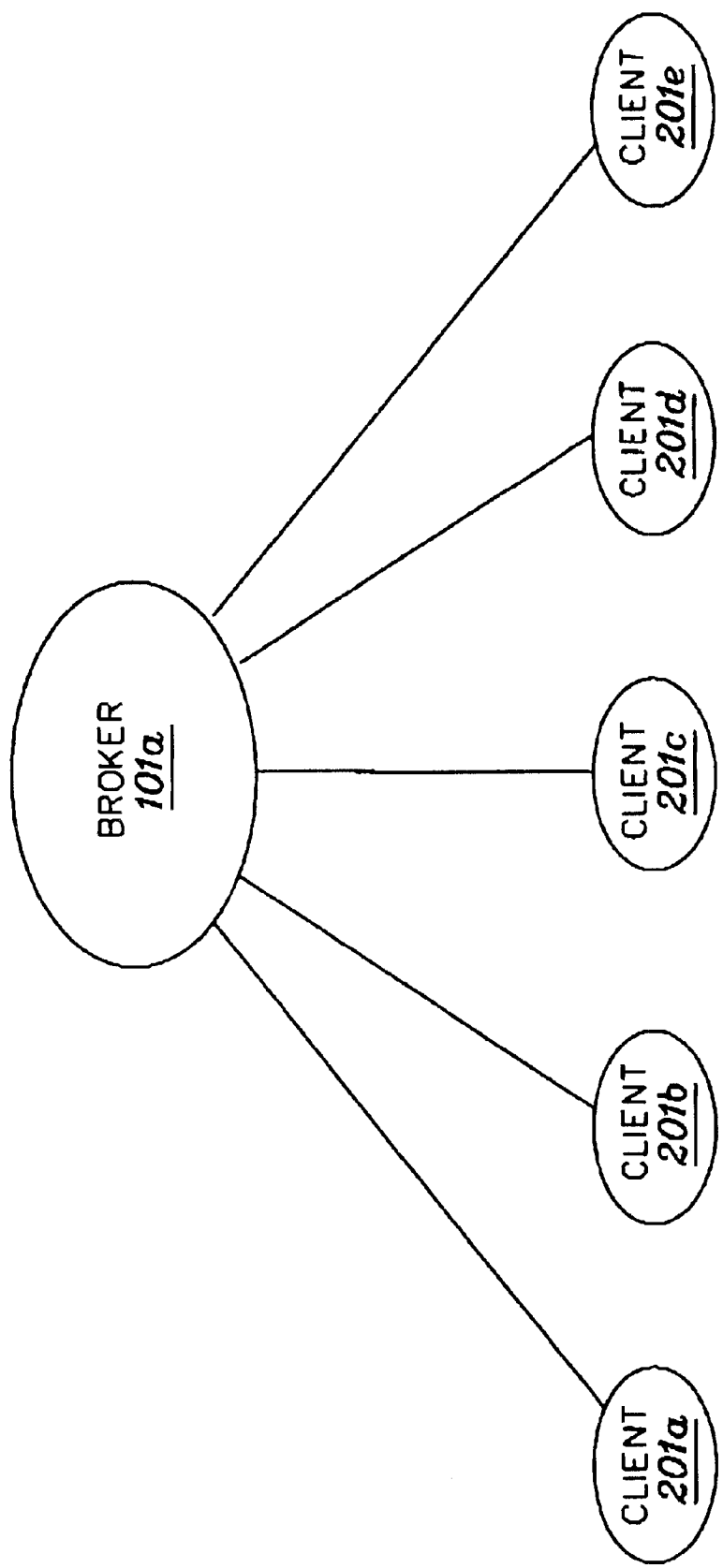
FIG. 2 depicts broker 101a of FIG. 1, and a collection of attached clients 201a–201e. Clients, which are also referred to herein as consumers, may be applications on the brokers themselves, or they may be on separate machines attached via a communication link such as a dial-up connection, or via a local area network (LAN).
Figures 3, 5:
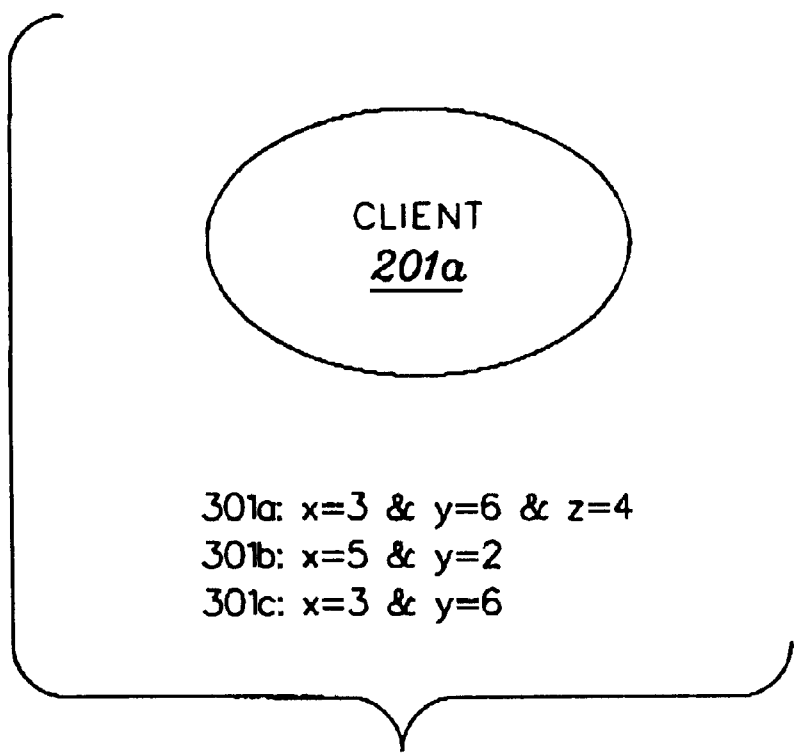
FIG. 3 illustrates by way of example a collection of content-based subscriptions associated with client 201a of FIG. 2. Each subscription is a predicate on attributes (in this example, x, y, and z) of published events. It represents a request for the system to deliver event messages whose attribute values satisfy the predicate.
FIG. 5 illustrates one embodiment of an event frequency table 501 in accordance with the present invention. Each row of the table corresponds to a particular attribute that may appear in events; and each column contains the probability of finding the particular value or range of values for that attribute. The table is used herein to compute the probability of particular subscription predicates being satisfied. Assuming that the attributes are independent (uncorrelated) such a table is sufficient to compute a probability for any possible subscription predicate. If the attributes are not independent, appropriate adjustments will be required so that the table can be used to compute the needed probabilities.

FIG. 1 depicts one such example of a computing environment for deployment of a routing facility in accordance with the present invention. In this environment, a collection of brokers 101a–101i are connected to an Internet protocol-based network, such as the Internet. As shown in FIG. 2, each broker 101 is assumed to have a number of clients, which are either applications running directly on the broker or more usually, applications running on client machines attached to the broker. In FIG. 2, broker 101a has clients 201a, 201b, 201c, 201d & 201e. Clients 201 can publish messages, whose content has been defined as pairs of attributes (such as x, y and z) and values. Clients can also issue subscriptions, such as subscriptions 301a, 301b, 301c for client 201 as depicted in FIG. 3. Subscriptions are predicates on the attributes, such as y=1 and z>5. The set of subscriptions is assumed to change slowly relative to the frequency with which events are published. Subscriptions represent requests for the system to deliver event messages whose attribute values satisfy the predicate.

Figure 4:
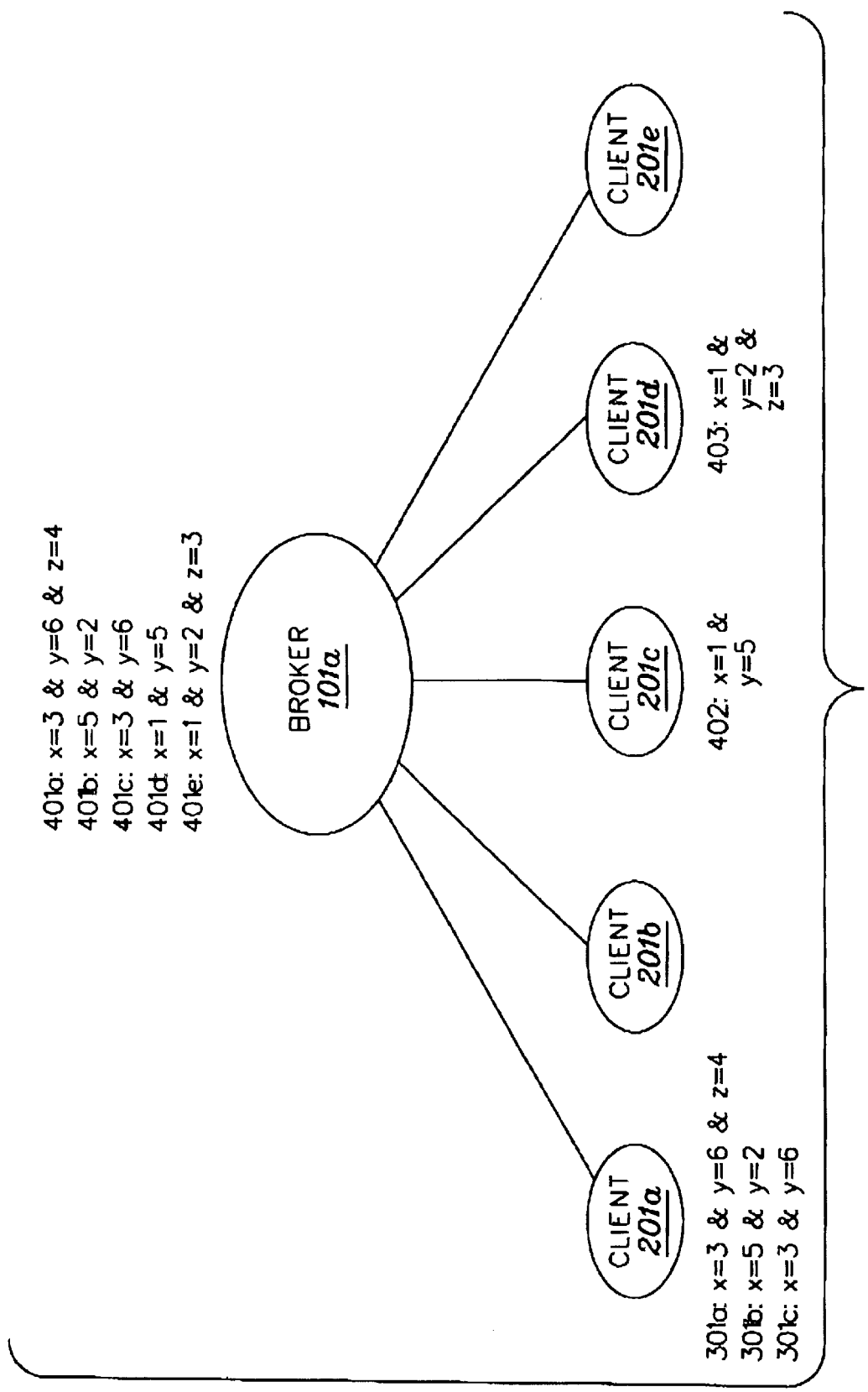
FIG. 4 illustrates by way of example a broker subscription table for broker 101a which records each subscription required by one of clients 201a–201e attached to the broker.

Brokers maintain tables 401a–401e, as shown in the example of FIG. 4, which record the subscriptions of all the clients they serve. Brokers use these tables when an event is received to determine which clients should receive the event.

A routing facility in accordance with the present invention advantageously exploits the fact that the relative probabilities for the values of each attribute can be periodically measured or estimated and stored into an event frequency table 501 such as depicted in FIG. 5. Each row of the table corresponds to a particular attribute that may appear in events to be published, while the columns indicate the probability of finding the cited value or range of values for that attribute. The table is used to compute the probability of particular subscription predicates'being satisfied. Assuming that the attributes are independent (or uncorrelated), the table is sufficient to compute a probability for any possible subscription predicate. If the attributes are not independent, appropriate adjustments are required so the table can be used to compute the needed probabilities as will be understood by one skilled in the art.

Generally stated, in accordance with the present invention, an initial set of groups 900 (FIG. 9) is built, and then collapsed into a smaller list of groups 1000 (FIG. 10) of approximate groups. One IP multicast group then corresponds to or is defined by each of the approximate groups in the collapsed list 1000 of FIG. 10. Each receiving broker listens for messages sent to any of the groups of which it is a member. Each sending broker will match events to one of the initial groups (e.g., using techniques from the above-incorporated United States patent application entitled "Method And System For Matching Consumers To Events") and then send the event message to the approximate group to which that initial group has been coalesced.

Figure 6:
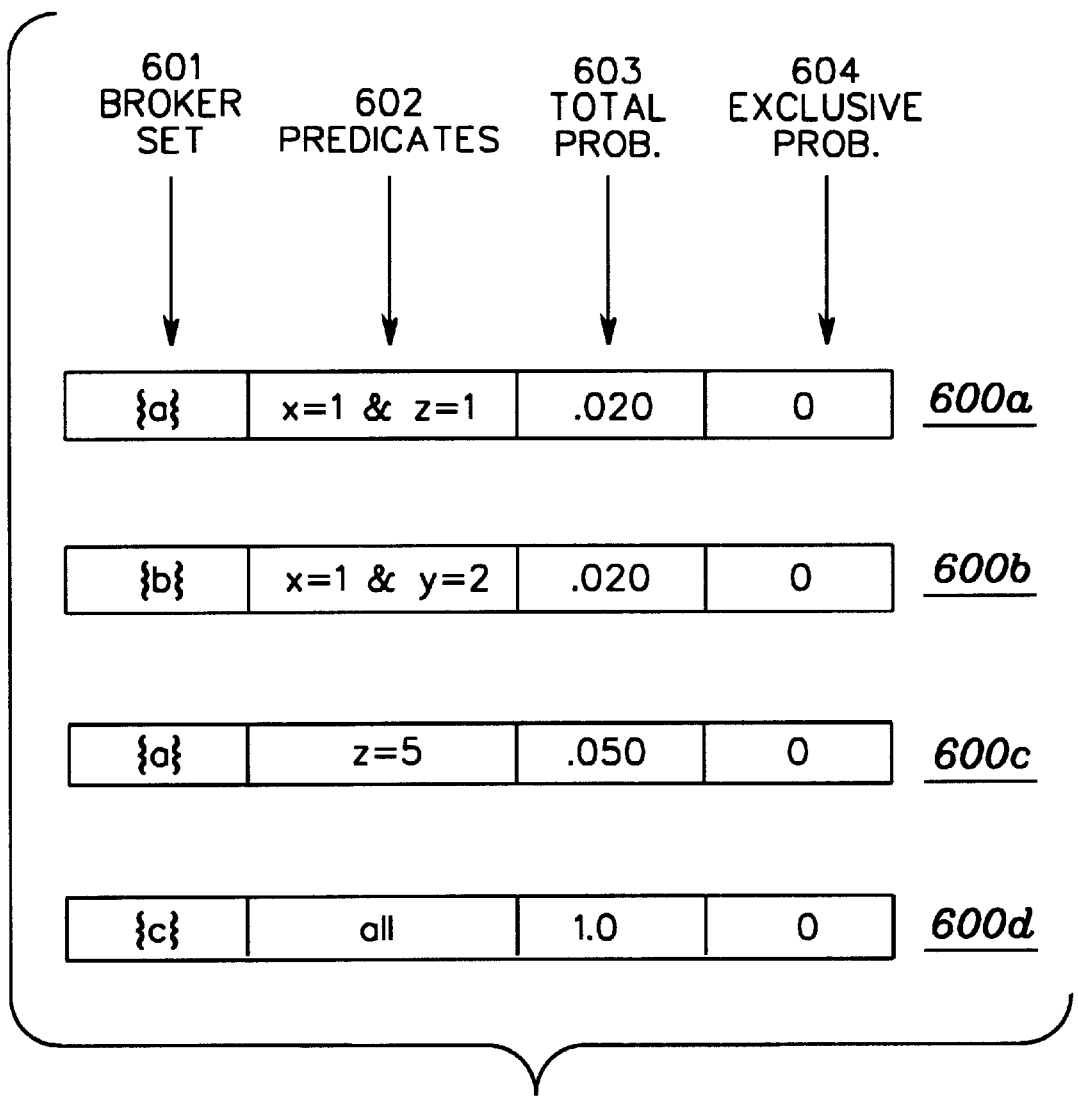
FIG. 6 illustrates a first step in the construction of an initial group lattice in accordance with the present invention. This construction uses as input the set of subscription predicates, the broker to which each subscription is attached, and the event frequency table 501. For each subscription in each broker subscription table (401a–401e), a node in the initial group lattice is created. Each node 600 contains: a broker set 601 specifying the set of brokers in the group; a set of predicates 602 constituting the sets of possible events which will be forwarded to these brokers; a total probability 603 which is the probability of a given event satisfying the listed predicates; and an exclusive probability 604, which is the total probability less the probability that a more refined predicate is satisfied. Initially the exclusive probability 604 is set to zero.
Figure 7:
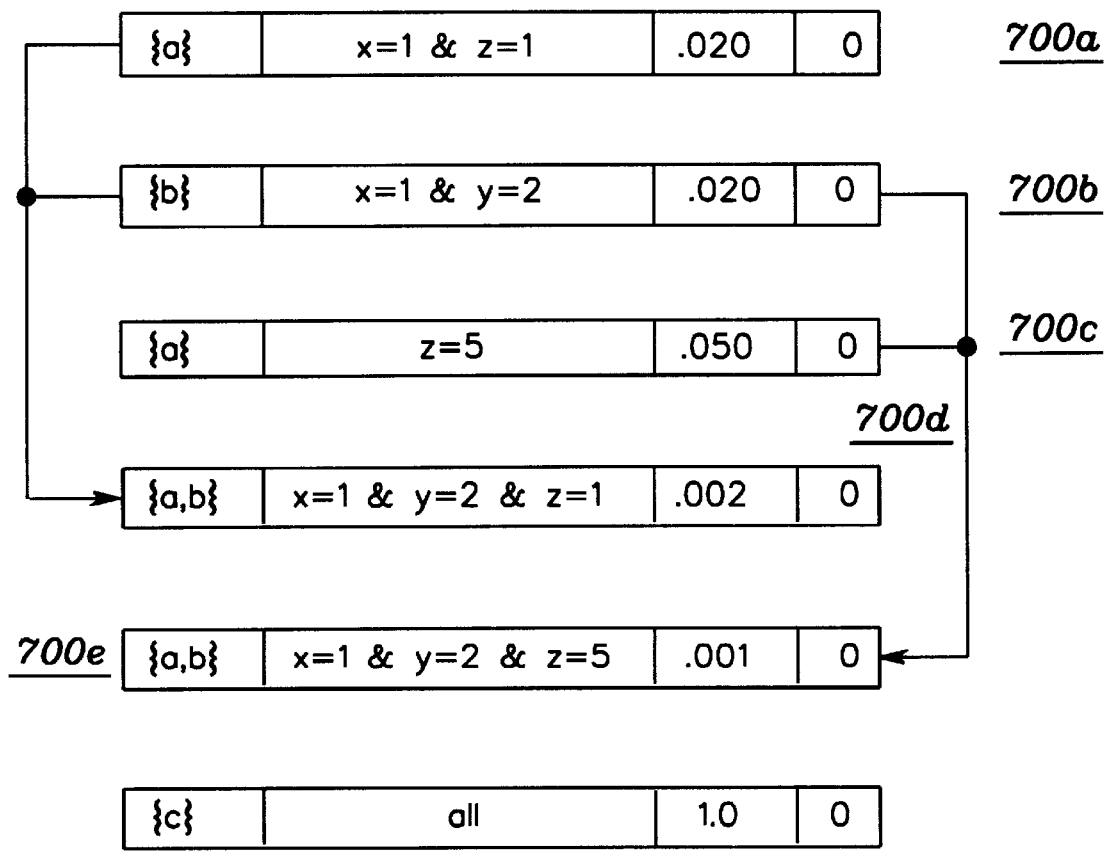
FIG. 7 illustrates one embodiment of a second step in the construction of one embodiment of the initial groups lattice in accordance with the present invention. If the predicates associated with a pair of nodes match a common subset of events then a new node is added to the lattice, i.e., if the new node does not already exist. For example, the predicates of nodes 700a and 700b match a common subset of events with predicate x=1 & y=2 & z=1. Thus, node 700d is created with the combined broker set of 700a and 700b (i.e. {a,b}), the common predicate (i.e., x=1 & y=2 & z=1), a combined probability determined from the event frequency table 501 (i.e. 0.2×0.1×0.1=0.002). The exclusive probability remains 0. Nodes 700b and 700c are similarly combined to form node 700e.
Figure 8:
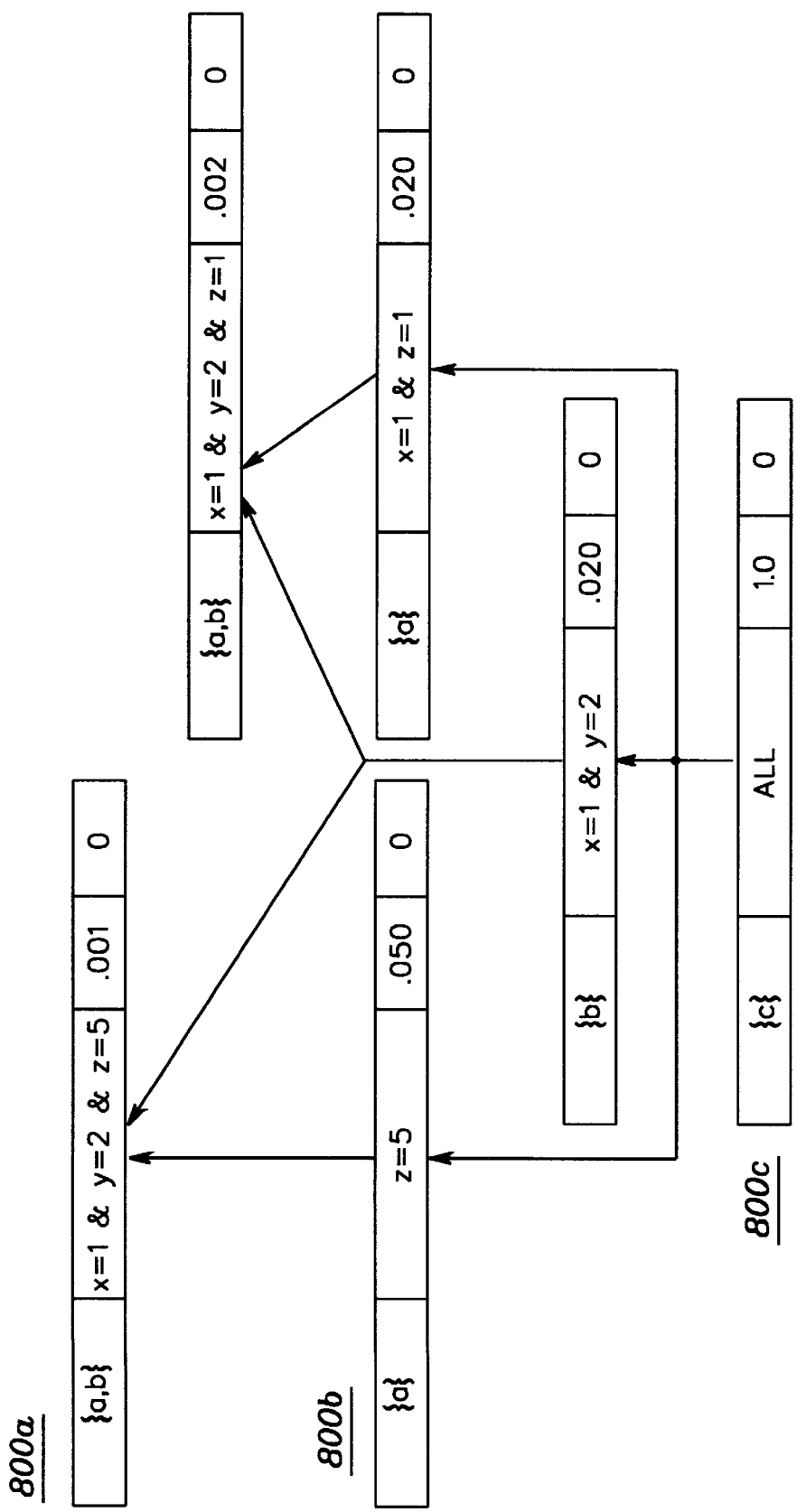
Figure 9:
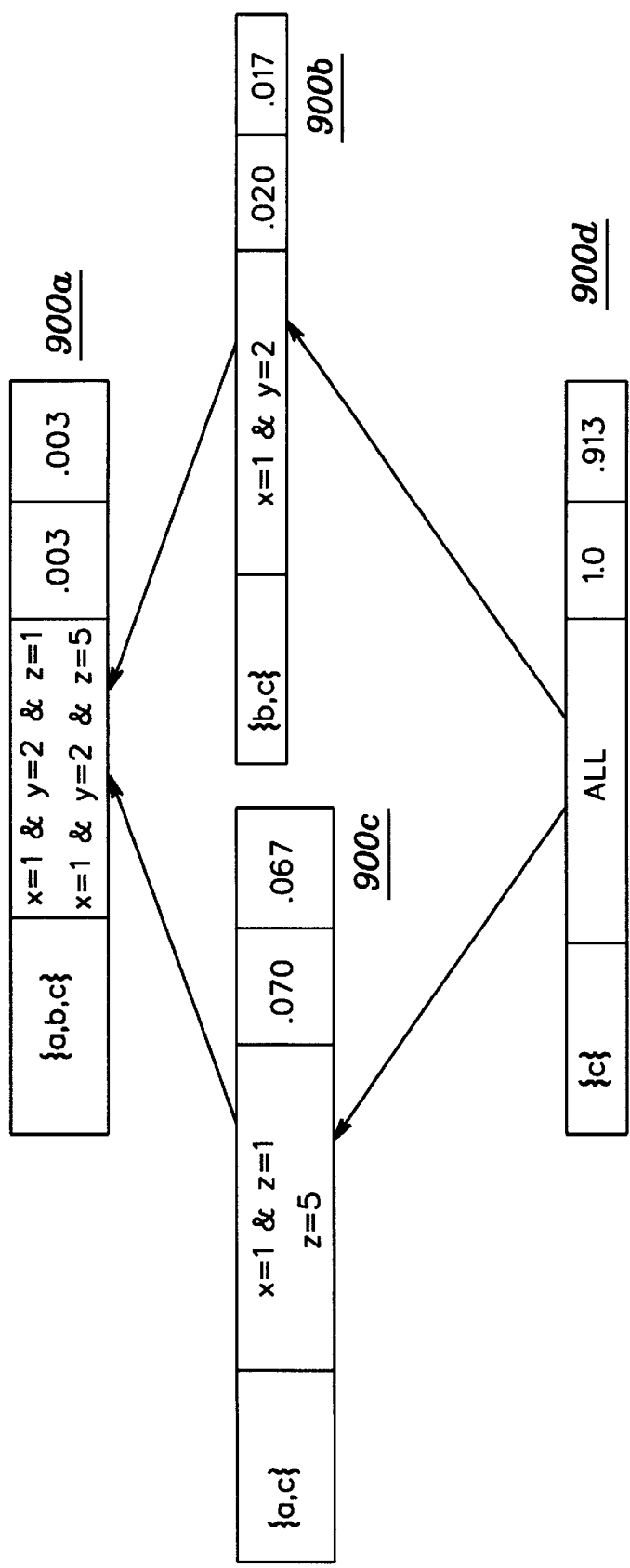
FIG. 9 illustrates a final embodiment of the initial groups lattice.

FIGS. 6–8 depict intermediate steps in the construction of an initial groups lattice, such as lattice 900 depicted in FIG. 9. In the example presented herein, construction of the initial groups lattice employs as input the set of subscription predicates, the broker to which each subscription is attached, and the event frequency table 501 of FIG. 5. For each subscription in each broker subscription table (e.g., 401a–401e), a node in the initial groups lattice is created. Each node 600 includes, for example, a broker set 601 specifying the set of brokers in the group, a set of predicates 602 constituting the set of possible events which will be forwarded to these brokers, a total probability 603 which is the probability of a given event satisfying the list of predicates, and an exclusive probability 604, which is the total probability less the probability that a more refined predicate is satisfied. For example, node 600a represents a subscription at a broker "a" with predicate x=1 and z=1, and this predicate is satisfied with probability 0.020. The exclusive probability for all nodes is initially set to 0.

If the predicates associated with a pair of nodes are partially overlapping, then a new node is added to the lattice as shown in FIG. 7, i.e., if it does not already exist. By way of example, the predicates of nodes 700a and 700b match a common subset of events with predicate x=1 & y=2 & z=1. Thus node 700d is created with a combined broker set of 700a and 700b (i.e., {a,b}), the common predicate (i.e., x=1 & y=2 & z=1), and combined probability determined from the event frequency table 501 (i.e., 0.2×0.1×0.1=0.002). The exclusive probability remains 0. Nodes 700b and 700c are similarly combined to form node 700e. This step of adding new nodes is repeated until there are no further pairs of nodes that partially overlap.

FIG. 8 illustrates a next step in the construction of the initial group lattice 900 of FIG. 9. A node A is "downward linked" to a node B if the predicate in A is a superset of the predicate in B. For example, node 800b is downward linked to node 800a because any event which matches the predicate x=1 & y=2 & z=5 will also match the predicate z=5. Similarly, node 800c is downward linked to node 800b. Transitive downward links are removed. For this example, if node A is downward linked to node B, and node B is downward linked to node C, then any downward link from node A to node C is removed. Thus, node 800c is not downward linked to node 800a.

Figure 10:
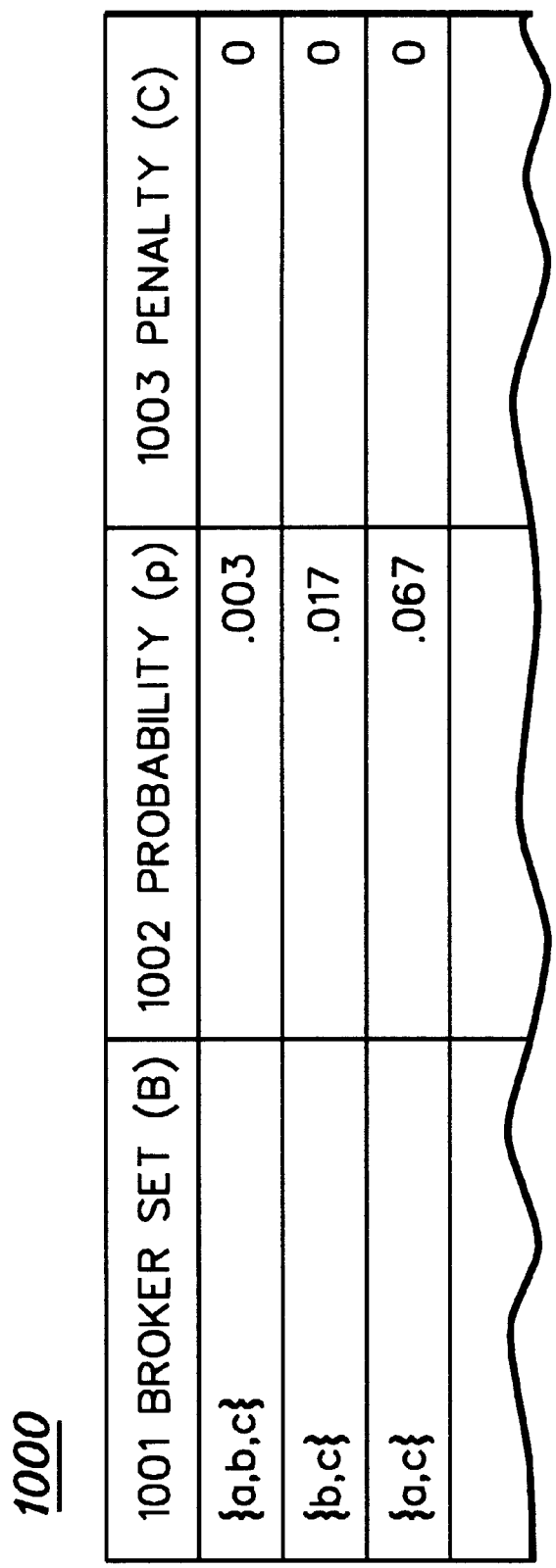
FIG. 10 shows one embodiment of an approximate groups table 1000 employed in accordance with the present invention. This table is constructed from the final version of the initial groups lattice. The table starts off with a row per group or node in the initial groups lattice, and then groups are coalesced using the algorithms of this invention. The goal is to produce no more than a user-specified number of groups, while minimizing the cost or penalty associated with coalescing groups. Each row contains Broker Set 1001 (B), which is the set of brokers in the group, the probability 1002 (p) of sending a message to this row, and the weighted cost penalty 1003 (C) of sending a message to this combined group.

FIG. 8 is transformed to FIG. 9 by propagating broker sets along downward links. Then nodes with equal broker sets are combined. Finally, the exclusive probabilities of each remaining node are computed as described below in connection with FIG. 11. Once the initial group lattice in final form is obtained, the nodes are used to create a list of groups as depicted in FIG. 10. In accordance with the present invention, this list of groups is next condensed into a smaller list of groups which comprise the IP multicast groups. The smaller list of approximate groups can be attained as described in FIG. 11. The goal of the present invention is to produce no more than a user-specified number of groups, and in so doing, minimize the cost or penalties associated with coalescing the groups. Each row of the resultant table contains a broker set 1001(b), which comprises the set of brokers in the group, a probability 1002(p) of sending a message to this row, and the weighted cost penalty 1003(C) of sending a message to this combined group. Detailed embodiments for constructing the initial groups lattice and the approximate groups table are presented in FIGS. 11 & 12, respectively.

Figure 11:
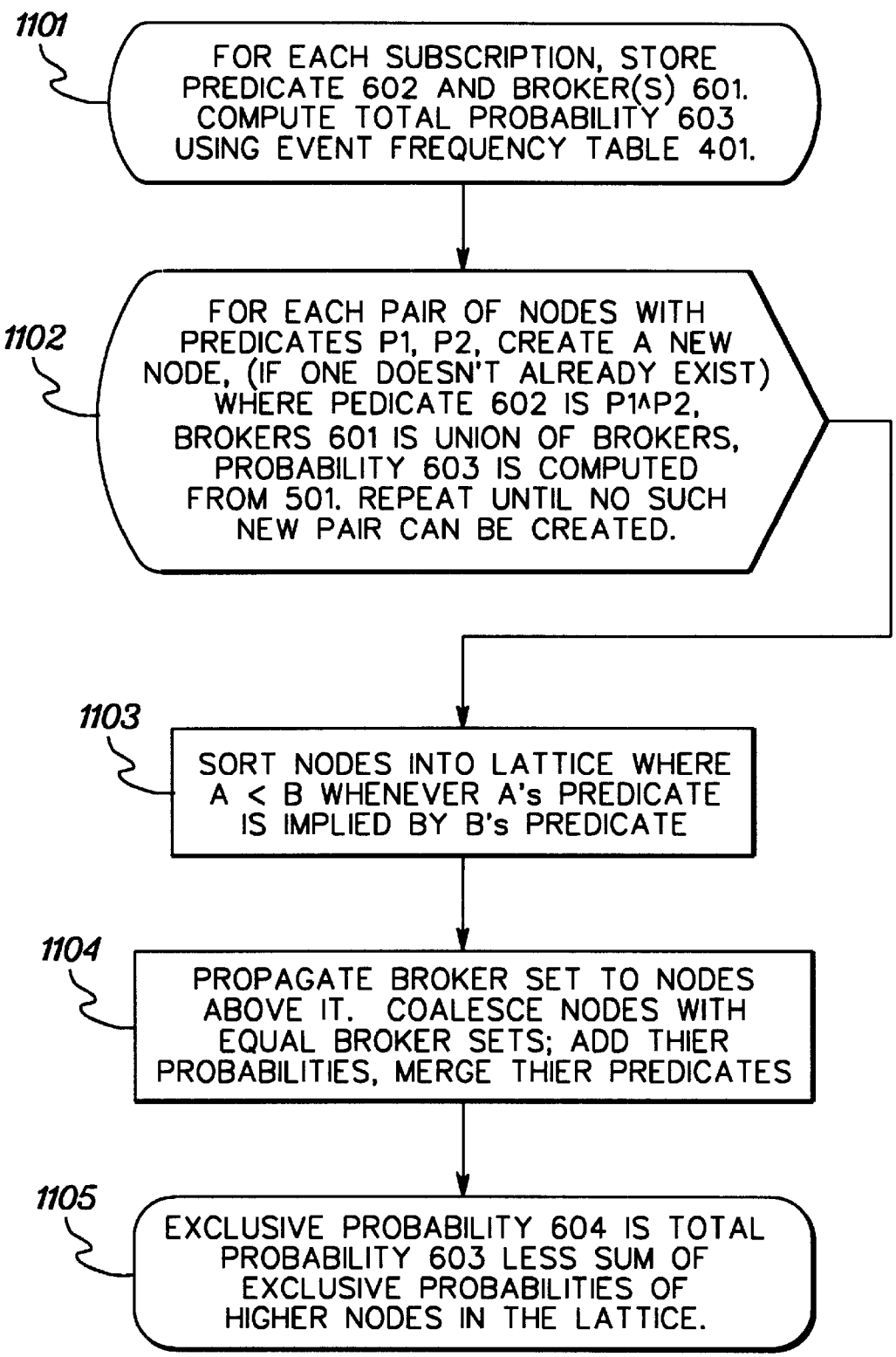
FIG. 11 is a flowchart of one embodiment for building the initial groups lattice 900 (FIG. 9) given a set of subscriptions 401a–401e (FIG. 4), their brokers 101 (FIG. 1), and the event frequencies 501 (FIG. 5).

The process of FIG. 11 is performed when an initial set of subscriptions is obtained, and can be rerun whenever these subscriptions change. However, one skilled in the art will be able to infer how to speed up the process of FIG. 11 so that it could be run incrementally rather than being rerun from scratch whenever a change is small.

The process begins by building a node 600 (FIG. 6) for each subscription predicate 1101. In one embodiment, the node has three fields: a broker set 601, which includes: a broker or brokers to which the client making a subscription that predicate was attached; a predicate list 602 containing the subscription predicate(s), and a probability computed by applying the event frequency table 501 (FIG. 5). For example, the brokers 101b and 101c each have a subscription x=1 & y=2, then a node is created having broker set {b,c}, predicate set "x=1, y=2", and probability 0.020 (multiplying the independent probabilities 0.2 for x=1 and 0.1 for y=2 obtained from the event frequency table 501.

Optionally, the size of this structure may be pruned by approximating the subscriptions by deleting less frequently tested attributes.

Next, a "closure" is built 1102 by doing the following: whenever two nodes exist whose subscription predicates overlap partially, a new node 700 (FIG. 7) is built in which the predicate 602 is the conjunction of the two predicates, the broker set 601 is the union of the two broker sets, and the probability is the probability of the conjunction. For example, node 700d of FIG.7 is built from nodes 700a and 700b in this way. Step 1102 is repeated as many times as needed until no new nodes can be created.

The resulting nodes are next sorted into a mathematical semilattice 1103. A node is considered to be "below" another node if its predicate is strictly implied by the predicate of the upper node. Note that transitive links are removed. For example, node 800a and node 800c of FIG. 8 are not linked because they are already transitively linked through node 800b.

Thereafter, broker information is propagated upward in the semilattice 1104. Any broker appearing in a broker set inserted into the broker sets of any nodes higher in the semilattice. If this causes two nodes to have the same broker set, those nodes are coalesced into a single node containing the given broker set, the union of the predicates, and the sum of the probabilities.

Finally, the exclusive probabilities 604 (FIG. 6) are computed 1105. For a node with no higher nodes in the lattice, the exclusive probability is simply the total probability. For example, node 900a (FIG. 9) has no higher node, so its exclusive probability is equal to the total probability, 0.003. For other nodes, the exclusive probability equals the total probability minus the sum of the exclusive probabilities of the nodes above it. For example, node 900b has a total probability of 0.020; that is, the probability of the predicate associated with it. But node 900a is above it; and events matching that more refined predicate will be sent to a larger group. Therefore, the probability of an event matching 900b but nothing above it is 0.020–0.003, or 0.017.

Figure 12:
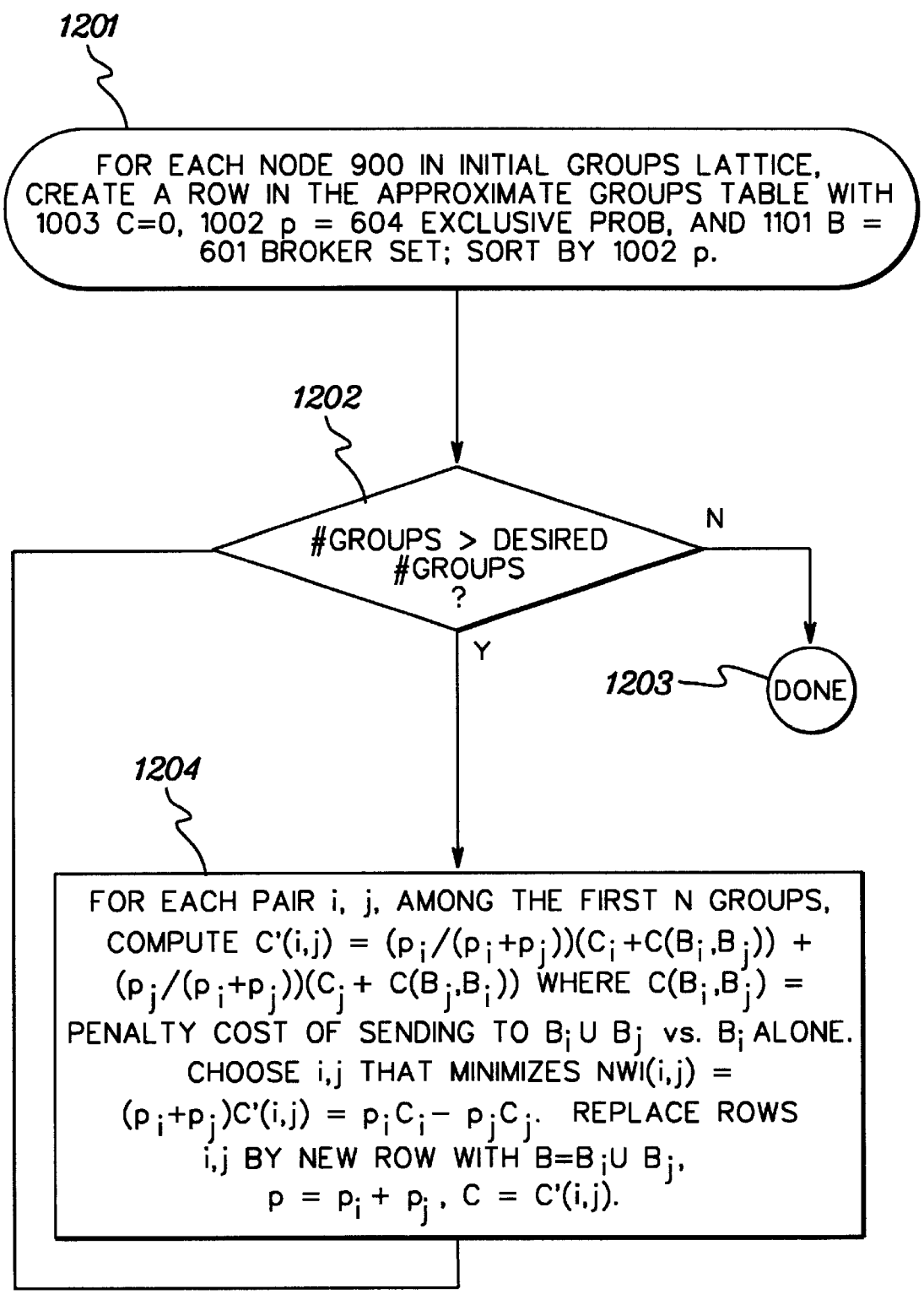
FIG. 12 is a flowchart illustrating one embodiment for building the approximate groups table 1000, given the initial groups lattice 900 (FIG. 9), and a rule for determining the penalty for sending to the union of the broker sets B1 and B2 rather than B1 or B2 alone.

After completing the process of FIG. 11, there exists a node for every possible distinct group of brokers consistent with a set of subscriptions, together with a probability that an event will go to exactly that set of brokers. FIG. 12 uses this information to build a collapsed set of approximate groups, referred to herein as the approximate groups table.

As noted, the process of FIG. 12 converts the initial groups lattice 900 into a sorted table called an approximate groups table 1000, and then coalesces rows in this table until, for example, the number of rows is no larger than maximum desired number of groups specified as a system parameter.

The initial value of the approximate groups table are initially built 1201 from the initial groups lattice 900 (FIG. 9). One row is created for each node in the lattice. There are three entries: a Broker Set 1001 (called B) (FIG. 10), which is obtained from the broker set 601 (FIG. 6) of the lattice node; a probability 1002 (called p), which is obtained from the exclusive probability 604 of the lattice node; and a cost or penalty 1003 (called C), which is the expected amount of waste due to the approximation, and which is initially set to 0 since no groups have been coalesced yet. After building the table 1000, the table is sorted in increasing order of key p; the secondary key is the size of the broker set in decreasing order. This sorting is done as a heuristic to prune the search for the optimal pair. Otherwise, the number of tests at each step would be equal to the square of an already large number.

Assuming that the number of groups is greater than the desired number or groups 1202, the processing of step 1204 is performed repeatedly until the number of groups is as small as the desired number, at which point processing is done 1203. In step 1204, we look for a pair of rows i and j to coalesce. If the heuristic is used, we will only look at combinations of the first N rows for some heuristically determined N. For each pair, a penalty C' (i,j) associated with the coalesced group is computed:

$$C'(i,j)=(p_i/(p_i+p_j))\ (C_i+C(B_i,B_j))+(p_j/(p_i+p_j))\ (C_j+C(B_j,B_i))$$

This formula uses a penalty function $C(B_i,B_j)$ which may be supplied by the system designer. This function is to be interpreted as the cost of sending a message to nodes in $B_i \cup B_j$ when it really should go only to the nodes in $B_i$. If link traffic is neglected, then this value can be approximated by $|B_j-B_i|$, the number of brokers in $B_j$ but not $B_i$. If link traffic is counted (assuming a particular location for the publisher or a distribution of locations for the publishers), then a different function may be used for $C(B_i,B_j)$ that takes into account the network topology. Note that the concepts of the present invention can be readily adapted for use with different penalty functions.

Once C' (i,j) is known, the net waste induced NWI(i,j) can be computed as follows:

$$NWI(i,j)=(p_i+p_j)C'(i,j)-p_iC_i-p_jC_j.$$

The pair i,j yielding the smallest NWI(i,j) is selected for coalescing. The fact of the coalescence is recorded into lattice 900 (FIG. 9), and the two rows of table 1000 (FIG. 10) are replaced by the single row with node set $B=B_i \cup B_j$, probability p $=p_i+p_j$, and cost C' (i,j)

After the table 1000 has been collapsed, each group in the table is assigned an IP multicast address.

Figure 13:
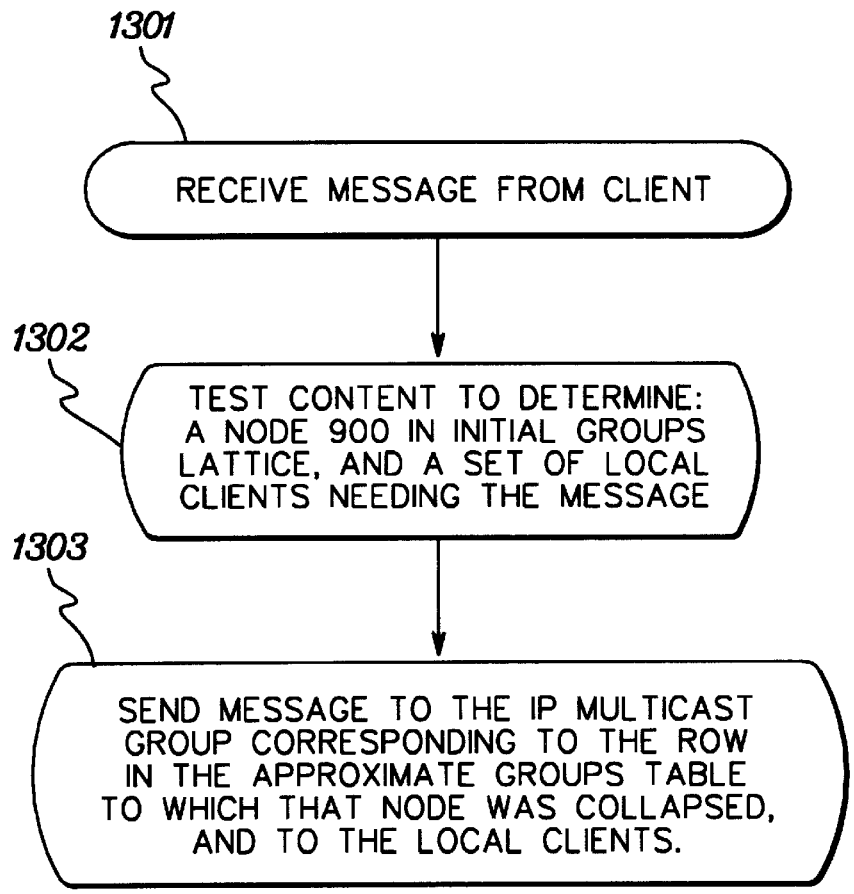
FIG. 13 shows one embodiment of the steps brokers follow when receiving a message from one of their clients, assuming content-based multicast routing in accordance with the present invention.
Figure 14:
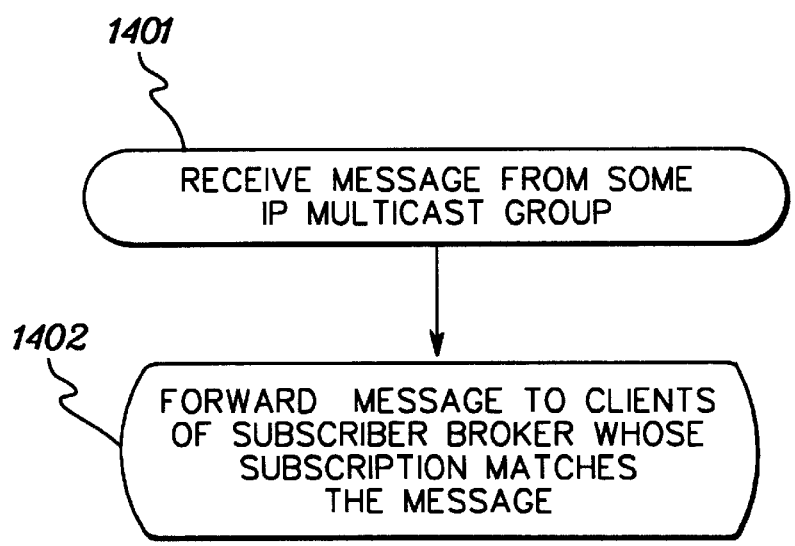
FIG. 14 shows one embodiment of the steps brokers follow when receiving a message sent from another broker via an approximate multicast group in accordance with the present invention.

FIG. 13 depicts a process flow followed by a broker when receiving a message from one of its clients, while FIG. 14 depicts a process followed by a broker when receiving a message sent from another broker via a multicast group. These processes assume that the approximate groups table has already been derived.

Referring first to FIG. 13, each broker attached to a publisher client receives the published message 1301. The received message is matched 1302 to a set of destinations using a content-based algorithm, such as the one described in the above-incorporated patent application entitled "Method And System For Matching Consumers To Events". If certain attributes were ignored in computing the approximate groups, then those same attributes are ignored in performing the matching. During this process, the message will be matched against subscriptions from local clients (that is, clients on the given broker), and against subscriptions from non-local clients to determine a set of local clients, and a set of destination brokers. This set of destination brokers corresponds to one of the original groups. The message is then forwarded to the set of local clients, and also to the approximate IP multicast group to which the original group was coalesced 1303. All the destination brokers listen for all IP multicast groups of which they are a member. As shown in FIG. 14, each destination broker will receive a message 1401 and simply forward it to those of its clients whose subscriptions match 1402. Because the groups are approximate, it is possible that a destination broker will receive a message that does not match the subscriptions of any of its clients.

Those skilled in the art will note from the above discussion that a multicast routing technique is provided herein wherein a large number of groups can be collapsed to a smaller number of groups, while approximately minimizing any expected penalty. Dynamic information about the existing set of subscriptions and the expected probabilities of different events is employed in order to perform this collapse.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for distributing events to consumers in a content-based publish-subscribe system, wherein the consumers each have at least one subscription, said method comprising:

outside of event processing time, deriving a set of g approximate multicast groups from a larger set of G possible multicast groups in the publish-subscribe system, said deriving including exploiting knowledge of subscription predicates of at least some consumers of the publish-subscribe system;

using at least one multicast group of said set of g approximate multicast groups to forward an event to at least one consumer within the publish-subscribe system; and wherein said deriving comprises employing a cost function to combine the possible multicast groups of the set of G possible multicast groups to arrive at the set of g approximate multicast groups.

2. The method of claim 1, wherein said exploiting comprises using probabilities that the subscriptions in the publish-subscribe system will match an event to condense the set of G possible multicast groups into the set of g approximate multicast groups.

3. The method of claim 1, wherein said deriving comprises determining a probability distribution of events in the publish-subscribe system and using the probability distribution of events to determine a probability for each of at least some subscriptions in the publish-subscribe system that the subscription will match an event, and condensing the set of G possible multicast groups into the set of g approximate multicast groups using the probabilities for the at least some subscriptions.

4. The method of claim 3, wherein said using the probability distribution of events to determine the probability for each of at least some subscriptions in the publish-subscribe system matching an event comprises using the probability distribution of events to determine a probability for each subscription in the publish-subscribe system that the subscription will match an event, and wherein said using the subscription probabilities comprises using the subscription probabilities for all subscriptions to condense the set of G possible multicast groups into the set of g approximate multicast groups.

5. The method of claim 3, wherein said deriving further comprises building an initial groups lattice using the probability distribution of events and the subscription probabilities of the at least some subscriptions, wherein the initial groups lattice includes a node corresponding to each possible multicast group and each node has associated therewith a probability that that node will receive an event.

6. The method of claim 5, wherein said condensing of the possible multicast groups comprises creating an approximate groups table wherein each row of the approximate groups table initially corresponds to a node of the initial groups lattice, and wherein said condensing comprises combining rows of the approximate groups table until a final approximate groups table is reached, wherein each row of the final approximate groups table comprises one approximate multicast group of the set of g approximate multicast groups.

7. The method of claim 6, wherein said combining rows of the approximate groups table comprises combining selected pairs of rows of the approximate groups table, wherein each selected pair is chosen based on consideration of a system cost for combining said selected pair of rows of the approximate groups table, wherein said system cost incorporates the probability of each group receiving an event, and wherein said combining seeks to minimize system costs.

8. The method of claim 6, wherein said combining at least two rows of the approximate groups table comprises combining rows of the approximate groups table until a desired number of rows in the approximate groups table is reached, wherein said desired number of rows equals said number g of approximate multicast groups in said set of g approximate multicast groups.

9. The method of claim 6, wherein said creating of the approximate groups table includes initially sorting rows thereof based on probability that the corresponding node of the initial groups lattice will receive an event, said sorting being from lowest probability to highest probability, and wherein said condensing possible multicast groups comprises condensing at least two rows out of N nodes first listed in the approximate groups table.

10. The method of claim 6, wherein said using comprises testing content of the event to be distributed to determine a node in the initial groups lattice and a set of local consumers needing the event; and sending the event to the approximate multicast group corresponding to a row in the approximate groups table to which the node was collapsed, and to the local consumers thereof.

11. The method of claim 10, further comprising for each subscriber broker in the approximate multicast group to which the node was collapsed, receiving the event and forwarding the event to consumers thereof whose subscriptions match the event.

12. The method of claim 1, wherein said deriving comprises ascertaining said set of g approximate multicast groups to meet a specified tolerance on one of a maximum number of multicast groups or a maximum percentage of wasted event messages during matching of the event to the consumer.

13. The method of claim 1, wherein said deriving comprises obtaining: (i) a set of subscriptions expressed as conjunctions of equality tests on event attributes, and a destination address per subscription; (ii) a frequency distribution of possible values of each event attribute; and (iii) a tolerance specifying either a maximum number of groups to generate or a maximum tolerated expected value of a number of wasted event messages delivered per event published.

14. The method of claim 1, wherein said publish-subscribe system is deployed over an internet protocol network.

15. The method of claim 1, wherein said exploiting comprises exploiting estimated or measured probabilities of different values of event content in condensing said set of G possible multicast groups into said set of g approximate multicast groups.

16. The method of claim 15, wherein said deriving further comprises exploiting a cost function measuring an expected penalty paid when an event intended for one possible multicast group is sent instead to a larger approximate multicast group.

17. The method of claim 1, wherein said deriving includes obtaining an event frequency table comprising a probability distribution of events in the publish-subscribe system, and wherein said deriving further comprises:

for each subscription, storing predicate and broker information therefor, and computing a total probability for the subscription using the event frequency table;

for each pair of nodes with predicates P1,P2, creating a new node, if one does not already exist, where the predicate is P1^P2, the broker set is a union of the brokers of the nodes, probability is computed from the event frequency table, and wherein said deriving comprises repeating said creating until no new pair can be created;

sorting the resulting nodes into a lattice where A<B whenever A's predicate is implied by B's predicate, wherein A and B comprise nodes;

propagating each broker set to nodes above it in the lattice, coalescing nodes with equal broker sets, adding their probabilities and merging their predicates; and ascertaining an exclusive probability for each resultant node in the lattice wherein the exclusive probability is the total probability for the node less a sum of exclusive probabilities of all higher nodes in the lattice.

18. The method of claim 17, further comprising creating an approximate groups table using the resultant lattice, said creating of the approximate groups table including:

for each node in the lattice, creating a row in the approximate groups table;

determining whether a number of rows in the approximate groups table is greater than a desired number of rows; and if so, for each pair i,j of rows in the approximate groups table, computing a penalty cost of sending an event message to the union of the pair of rows i,j, versus sending to the event one or the other of the rows individually, and choosing a row pairing i,j that minimizes network penalty, and replacing rows i,j by a new row comprising the union of rows i,j.

19. The method of claim 18, further comprising repeating said computing of the penalty cost and choosing a minimum expected penalty to condense additional pairs of rows of the approximate groups table until the number of rows in the approximate groups table is equal to a prespecified, desired number of rows in the approximate groups table.

20. At least one program storage device readable by a machine, tangibly embodying at least one program of instructions executable by the machine to perform a method for distributing events to consumers in a content-based publish-subscribe system, wherein the consumers each have at least one subscription, said method comprising:

deriving, outside of event processing time, a set of g approximate multicast groups from a larger set of G possible multicast groups in the publish-subscribe system, said deriving including exploiting knowledge of subscription predicates of at least some consumers of the publish-subscribe system;

using at least one multicast group of said set of g approximate multicast groups to forward an event to at least one consumer within the publish-subscribe system; and wherein said deriving comprises employing a cost function to combine the possible multicast groups of the set of G possible multicast groups to arrive at the set of g approximate multicast groups.

21. The at least one program storage device of claim 20, wherein said exploiting comprises using probabilities that the subscriptions in the publish-subscribe system will match an event to condense the set of G possible multicast groups into the set of g approximate multicast groups.

22. The at least one program storage device of claim 20, wherein said deriving comprises determining a probability distribution of events in the publish-subscribe system and using the probability distribution of events to determine a probability for each of at least some subscriptions in the publish-subscribe system that the subscription will match an event, and condensing the set of G possible multicast groups into the set of g approximate multicast groups using the probabilities for the at least some subscriptions.

23. The at least one program storage device of claim 22, wherein said using the probability distribution of events to determine the probability for each of at least some subscriptions in the publish-subscribe system matching an event comprises using the probability distribution of events to determine a probability for each subscription in the publish-subscribe system that the subscription will match an event, and wherein said using the subscription probabilities comprises using the subscription probabilities for all subscriptions to condense the set of G possible multicast groups into the set of g approximate multicast groups.

24. The at least one program storage device of claim 22, wherein said deriving further comprises building an initial groups lattice using the probability distribution of events and the subscription probabilities of the at least some subscriptions, wherein the initial groups lattice includes a node corresponding to each possible multicast group and each node has associated therewith a probability that that node will receive an event.

25. The at least one program storage device of claim 24, wherein said condensing of the possible multicast groups comprises creating an approximate groups table wherein each row of the approximate groups table initially corresponds to a node of the initial groups lattice, and wherein said condensing comprises combining rows of the approximate groups table until a final approximate groups table is reached, wherein each row of the final approximate groups table comprises one approximate multicast group of the set of g approximate multicast groups.

26. The at least one program storage device of claim 25, wherein said combining rows of the approximate groups table comprises combining selected pairs of rows of the approximate groups table, wherein each selected pair is chosen based on consideration of a system cost for combining said selected pair of rows of the approximate groups table, wherein said system cost incorporates the probability of each group receiving an event, and wherein said combining seeks to minimize system costs.

27. The at least one program storage device of claim 25, wherein said combining at least two rows of the approximate groups table comprises combining rows of the approximate groups table until a desired number of rows in the approximate groups table is reached, wherein said desired number of rows equals said number g of approximate multicast groups in said set of g approximate multicast groups.

28. The at least one program storage device of claim 25, wherein said creating of the approximate groups table includes initially sorting rows thereof based on probability that the corresponding node of the initial groups lattice will receive an event, said sorting being from lowest probability to highest probability, and wherein said condensing possible multicast groups comprises condensing at least two rows out of N nodes first listed in the approximate groups table.

29. The at least one program storage device of claim 25, wherein said using comprises testing content of the event to be distributed to determine a node in the initial groups lattice and a set of local consumers needing the event; and sending the event to the approximate multicast group corresponding to a row in the approximate groups table to which the node was collapsed, and to the local consumers thereof.

30. The at least one program storage device of claim 29, further comprising for each subscriber broker in the approximate multicast group to which the node was collapsed, receiving the event and forwarding the event to consumers thereof whose subscriptions match the event.

31. The at least one program storage device of claim 20, wherein said deriving comprises ascertaining said set of g approximate multicast groups to meet a specified tolerance on one of a maximum number of multicast groups or a maximum percentage of wasted event messages during matching of the event to the consumer.

32. The at least one program storage device of claim 20, wherein said deriving comprises obtaining: (i) a set of subscriptions expressed as conjunctions of equality tests on event attributes, and a destination address per subscription; (ii) a frequency distribution of possible values of each event attribute; and (iii) a tolerance specifying either a maximum number of groups to generate or a maximum tolerated expected value of a number of wasted event messages delivered per event published.

33. The at least one program storage device of claim 20, wherein said publish-subscribe system is deployed over an internet protocol network.

34. The at least one program storage device of claim 20, wherein said exploiting comprises exploiting estimated or measured probabilities of different values of event content in condensing said set of G possible multicast groups into said set of g approximate multicast groups.

35. The at least one program storage device of claim 34, wherein said deriving further comprises exploiting a cost function measuring an expected penalty paid when an event intended for one possible multicast group is sent instead to a larger approximate multicast group.

36. The at least one program storage device of claim 20, wherein said deriving includes obtaining an event frequency table comprising a probability distribution of events in the publish-subscribe system, and wherein said deriving further comprises:

for each subscription, storing predicate and broker information therefor, and computing a total probability for the subscription using the event frequency table;

for each pair of nodes with predicates P1,P2, creating a new node, if one does not already exist, where the predicate is P1^P2, the broker set is a union of the brokers of the nodes, probability is computed from the event frequency table, and wherein said deriving comprises repeating said creating until no new pair can be created;

sorting the resulting nodes into a lattice where A<B whenever A's predicate is implied by B's predicate, wherein A and B comprise nodes;

propagating each broker set to nodes above it in the lattice, coalescing nodes with equal broker sets, adding their probabilities and merging their predicates; and ascertaining an exclusive probability for each resultant node in the lattice wherein the exclusive probability is the total probability for the node less a sum of exclusive probabilities of all higher nodes in the lattice.

37. The at least one program storage device of claim 36, further comprising creating an approximate groups table using the resultant lattice, said creating of the approximate groups table including:

for each node in the lattice, creating a row in the approximate groups table;

determining whether a number of rows in the approximate groups table is greater than a desired number of rows; and if so, for each pair i,j of rows in the approximate groups table, computing a penalty cost of sending an event message to the union of the pair of rows i,j, versus sending to the event one or the other of the rows individually, and choosing a row pairing i,j that minimizes network penalty, and replacing rows i,j by a new row comprising the union of rows i,j.

38. The at least one program storage device of claim 37, further comprising repeating said computing of the penalty cost and choosing a minimum expected penalty to condense additional pairs of rows of the approximate groups table until the number of rows in the approximate groups table is equal to a prespecified, desired number of rows in the approximate groups table.

39. A system for distributing events to consumers in a content-based publish-subscribe system, wherein the consumers each have at least one subscription, said system comprising:

means for deriving outside of event processing time a set of g approximate multicast groups from a larger set of G possible multicast groups in the publish-subscribe system, said means for deriving including means for exploiting knowledge of subscription predicates of at least some consumers of the publish-subscribe system;

means for using at least one multicast group of said set of g approximate multicast groups to forward an event to at least one consumer within the publish-subscribe system; and wherein said means for deriving comprises means for employing a cost function to combine the possible multicast groups of the set of G possible multicast groups to arrive at the set of g approximate multicast groups.

40. The system of claim 39, wherein said means for exploiting comprises means for using probabilities that the subscriptions in the publish-subscribe system will match an event to condense the set of G possible multicast groups into the set of g approximate multicast groups.

41. The system of claim 39, wherein said means for deriving comprises means for determining a probability distribution of events in the publish-subscribe system and for using the probability distribution of events to determine a probability for each of at least some subscriptions in the publish-subscribe system that the subscription will match an event, and means for condensing the set of G possible multicast groups into the set of g approximate multicast groups using the probabilities for the at least some subscriptions.

42. The system of claim 41, wherein said means for using the probability distribution of events to determine the probability for each of at least some subscriptions in the publish-subscribe system matching an event comprises means for using the probability distribution of events to determine a probability for each subscription in the publish-subscribe system that the subscription will match an event, and wherein said means for using the subscription probabilities comprises means for using the subscription probabilities for all subscriptions to condense the set of G possible multicast groups into the set of g approximate multicast groups.

43. The system of claim 41, wherein said means for deriving further comprises means for building an initial groups lattice using the probability distribution of events and the subscription probabilities of the at least some subscriptions, wherein the initial groups lattice includes a node corresponding to each possible multicast group and each node has associated therewith a probability that that node will receive an event.

44. The system of claim 43, wherein said means for condensing of the possible multicast groups comprises means for creating an approximate groups table wherein each row of the approximate groups table initially corresponds to a node of the initial groups lattice, and wherein said means for condensing comprises means for combining rows of the approximate groups table until a final approximate groups table is reached, wherein each row of the final approximate groups table comprises one approximate multicast group of the set of g approximate multicast groups.

45. The system of claim 44, wherein said means for combining rows of the approximate groups table comprises means for combining selected pairs of rows of the approximate groups table, wherein each selected pair is chosen based on consideration of a system cost for combining said selected pair of rows of the approximate groups table, wherein said system cost incorporates the probability of each group receiving an event, and wherein said combining seeks to minimize system costs.

46. The system of claim 44, wherein said means for combining at least two rows of the approximate groups table comprises means for combining rows of the approximate groups table until a desired number of rows in the approximate groups table is reached, wherein said desired number of rows equals said number g of approximate multicast groups in said set of g approximate multicast groups.

47. The system of claim 44, wherein said means for creating of the approximate groups table includes means for initially sorting rows thereof based on probability that the corresponding node of the initial groups lattice will receive an event, said sorting being from lowest probability to highest probability, and wherein said means for condensing possible multicast groups comprises means for condensing at least two rows out of N nodes first listed in the approximate groups table.

48. The system of claim 44, wherein said means for using comprises means for testing content of the event to be distributed to determine a node in the initial groups lattice and a set of local consumers needing the event; and means for sending the event to the approximate multicast group corresponding to a row in the approximate groups table to which the node was collapsed, and to the local consumers thereof.

49. The system of claim 44, further comprising for each subscriber broker in the approximate multicast group to which the node was collapsed, means for receiving the event and for forwarding the event to consumers thereof whose subscriptions match the event.

50. The system of claim 39, wherein said means for deriving comprises means for ascertaining said set of g approximate multicast groups to meet a specified tolerance on one of a maximum number of multicast groups or a maximum percentage of wasted event messages during matching of the event to the consumer.

51. The system of claim 39, wherein said means for deriving comprises means for obtaining: (i) a set of subscriptions expressed as conjunctions of equality tests on event attributes, and a destination address per subscription; (ii) a frequency distribution of possible values of each event attribute; and (iii) a tolerance specifying either a maximum number of groups to generate or a maximum tolerated expected value of a number of wasted event messages delivered per event published.

52. The system of claim 39, wherein said publish-subscribe system is deployed over an internet protocol network.

53. The system of claim 39, wherein said means for exploiting comprises means for exploiting estimated or measured probabilities of different values of event content in condensing said set of G possible multicast groups into said set of g approximate multicast groups.

54. The system of claim 53, wherein said means for deriving further comprises means for exploiting a cost function measuring an expected penalty paid when an event intended for one possible multicast group is sent instead to a larger approximate multicast group.

55. The system of claim 39, wherein said means for deriving includes means for obtaining an event frequency table comprising a probability distribution of events in the publish-subscribe system, and wherein said means for deriving further comprises:

for each subscription, means for storing predicate and broker information therefor, and for computing a total probability for the subscription using the event frequency table;

for each pair of nodes with predicates P1,P2, means for creating a new node, if one does not already exist, where the predicate is P1^P2, the broker set is a union of the brokers of the nodes, probability is computed from the event frequency table, and wherein said means for deriving comprises means for repeating said creating until no new pair can be created;

means for sorting the resulting nodes into a lattice where A<B whenever A's predicate is implied by B's predicate, wherein A and B comprise nodes;

means for propagating each broker set to nodes above it in the lattice, means for coalescing nodes with equal broker sets, means for adding their probabilities and means for merging their predicates; and means for ascertaining an exclusive probability for each resultant node in the lattice wherein the exclusive probability is the total probability for the node less a sum of exclusive probabilities of all higher nodes in the lattice.

56. The system of claim 55, further comprising means for creating an approximate groups table using the resultant lattice, said means for creating of the approximate groups table including:

for each node in the lattice, means for creating a row in the approximate groups table;

means for determining whether a number of rows in the approximate groups table is greater than a desired number of rows; and if so, for each pair i,j of rows in the approximate groups table, means for computing a penalty cost of sending an event message to the union of the pair of rows i,j, versus sending to the event one or the other of the rows individually, and means for choosing a row pairing i,j that minimizes network penalty, and means for replacing rows i,j by a new row comprising the union of rows i,j.

57. The system of claim 56, further comprising means for repeating said means for computing of the penalty cost and choosing a minimum expected penalty to condense additional pairs of rows of the approximate groups table until the number of rows in the approximate groups table is equal to a prespecified, desired number of rows in the approximate groups table.

\* \* \* \* \*

UNITED STATES PATENT AND TRADEMARK OFFICE
CERTIFICATE OF CORRECTION

PATENT NO. : 6,728,715 B1  Page 1 of 1
DATED : April 27, 2004
INVENTOR(S) : Astley et al.

It is certified that error appears in the above-identified patent and that said Letters Patent is hereby corrected as shown below:

Column 10,
Line 65, insert the word -- some -- after the word "than"

Signed and Sealed this

Twenty-seventh Day of July, 2004

JON W. DUDAS
*Acting Director of the United States Patent and Trademark Office*